(12) United States Patent
Chitwood et al.

(10) Patent No.: US 7,757,707 B2
(45) Date of Patent: Jul. 20, 2010

(54) WELL HEAD VALVE INSULATOR

(76) Inventors: Bill Chitwood, P.O. Box 699, Rock Springs, WY (US) 82902; Jerome D. Chitwood, 230 Mesa Dr., Rock Springs, WY (US) 82902

( * ) Notice: Subject to any disclaimer, the term of this patent is extended or adjusted under 35 U.S.C. 154(b) by 615 days.

(21) Appl. No.: 11/703,684

(22) Filed: Feb. 8, 2007

(65) Prior Publication Data
US 2007/0289636 A1   Dec. 20, 2007

Related U.S. Application Data

(60) Provisional application No. 60/814,555, filed on Jun. 19, 2006.

(51) Int. Cl.
*F16K 49/00* (2006.01)
(52) U.S. Cl. .................. 137/341; 137/375; 219/531; 219/385
(58) Field of Classification Search ............. 137/341, 137/334, 377, 363, 364, 375, 382, 339, 340; 220/592.25, 567.3; 219/531, 385; 264/321; 285/47
See application file for complete search history.

(56) References Cited

U.S. PATENT DOCUMENTS

| | | | | |
|---|---|---|---|---|
| 2,518,863 A | * | 8/1950 | Camden, Jr. et al. | ......... 219/201 |
| 3,221,872 A | * | 12/1965 | Wood | ........................... 206/305 |
| 3,556,158 A | | 1/1971 | Schneider | |
| 3,846,616 A | * | 11/1974 | Beck | ........................... 392/487 |
| 4,449,554 A | | 5/1984 | Busse | |
| 4,558,206 A | * | 12/1985 | Ball | ........................... 392/468 |
| 4,562,857 A | | 1/1986 | Ball | |
| 4,696,324 A | | 9/1987 | Petronko | |
| 4,726,394 A | | 2/1988 | Devine | |
| 4,807,669 A | | 2/1989 | Prestidge, Sr. | |
| 4,989,626 A | * | 2/1991 | Takagi et al. | ................... 137/13 |

(Continued)

FOREIGN PATENT DOCUMENTS

EP   0 099 870   2/1984

(Continued)

OTHER PUBLICATIONS http://www.mocoat.com/ConicalShelter.htm "Conical Wellhead Shelters" retrieved on Jan. 31, 2006.

(Continued)

*Primary Examiner*—John Rivell
*Assistant Examiner*—Macade Brown
(74) *Attorney, Agent, or Firm*—Richard C. Litman

(57) ABSTRACT

The well head valve insulator provides insulation to a gas or oil well head. The insulator is formed with a two-piece outer shell that has a height and diameter custom-fitted to the well head, which is filled with foam insulation, preferably polyurethane foam that is molded to the configuration of the particular well head. The insulator includes heating element supports for supporting a hose or heating coil that is used to periodically heat the valve through the flow of warm fluid. The two halves of the insulator can be opened and reclosed around the well head in order to provide access for routine maintenance. Optionally, the insulator may be furnished with a temperature sensor for monitoring the temperature of the well head, or with a thermostatic control for regulating heat delivered by the heating coil.

14 Claims, 4 Drawing Sheets

U.S. PATENT DOCUMENTS

| | | |
|---|---|---|
| 4,993,450 A | 2/1991 | Dunn |
| 5,609,784 A | 3/1997 | Davenport |
| 5,743,289 A | 4/1998 | Griffin et al. |
| 6,079,439 A | 6/2000 | Hartley |
| 6,186,988 B1 * | 2/2001 | Sabacinski et al. .......... 604/289 |
| 6,293,301 B1 | 9/2001 | Griffin et al. |
| 6,561,215 B1 | 5/2003 | Wakefield |
| 2002/0066483 A1 | 6/2002 | Sweeney et al. |

FOREIGN PATENT DOCUMENTS

| | | |
|---|---|---|
| GB | 2 248 100 | 3/1992 |

OTHER PUBLICATIONS http://www.focusindustries.ca/tankswellhead.asp "Wellhead Shelters" retrieved on Jan. 31, 2006.

* cited by examiner

WELL HEAD VALVE INSULATOR

CROSS-REFERENCE TO RELATED APPLICATION

This application claims the benefit of U.S. Provisional Patent Application Ser. No. 60/814,555, filed Jun. 19, 2006.

BACKGROUND OF THE INVENTION

1. Field of the Invention

The present invention relates to removable insulation for fittings, in a fluid flow system, and more particularly to a well head valve insulator for insulating the valves in a natural gas well head.

2. Description of the Related Art

In insulating piping systems used for transmission of gases and/or fluids in cold climates, insulation may be provided for cylindrical piping. In the case of a gas well head, for example, there exist various elements, such as flanges, tees, elbows, reducers, valves, and the like, that protrude from the generally cylindrical shape of the main pipe, so that the well head is often referred to as a tree.

The valves in the well head assembly are custom-fitted to accommodate various pressures that may be encountered at the well head site. Thus, prefabrication of a well head valve insulator is not a practical alternative.

As a result, when it is necessary to insulate the well head, fiberglass insulation is cut from a roll, wrapped around the well head, and secured with tape. Such an installation attracts rodents, insects and various pests, which nest in the insulation. The valve tree periodically requires greasing and other maintenance. The insulation must be cut away and discarded to perform such maintenance, exposing the maintenance workers to health hazards from diseases spread by the pests that nest in the insulation, and incurring additional cost and labor to replace the insulation.

While various insulators for gas and oil delivery pipes have been proposed, none have been found entirely satisfactory. Thus, a well head valve insulator solving the aforementioned problems is desired.

SUMMARY OF THE INVENTION

The well head valve insulator provides insulation to a gas or oil well head. The insulator is formed with a two-piece outer shell that has a height and diameter custom-fitted to the well head, which is filled with foam insulation, preferably polyurethane foam, that is molded to the configuration of the particular well head. The insulator includes heating element supports for supporting a hose or heating coil that is used to periodically heat the valve through the flow of heated fluid. The two halves of the insulator can be opened and reclosed around the well head in order to provide access for routine maintenance. Optionally, the insulator may be furnished with a temperature sensor for monitoring the temperature of the well head, or with a thermostatic control for regulating heat delivered by the heating coil.

A method of forming the well head valve insulator includes the steps of forming a two-piece outer shell of rigid or semi-rigid material around the well head, mounting at least one heating coil support within the outer shell, installing the heater coil, closing the shell around the well head, injecting foam insulation into the outer shell, allowing the foam to cure, and pulling a flexible wire cutter or other separator through the foam to separate the inner foam insulation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
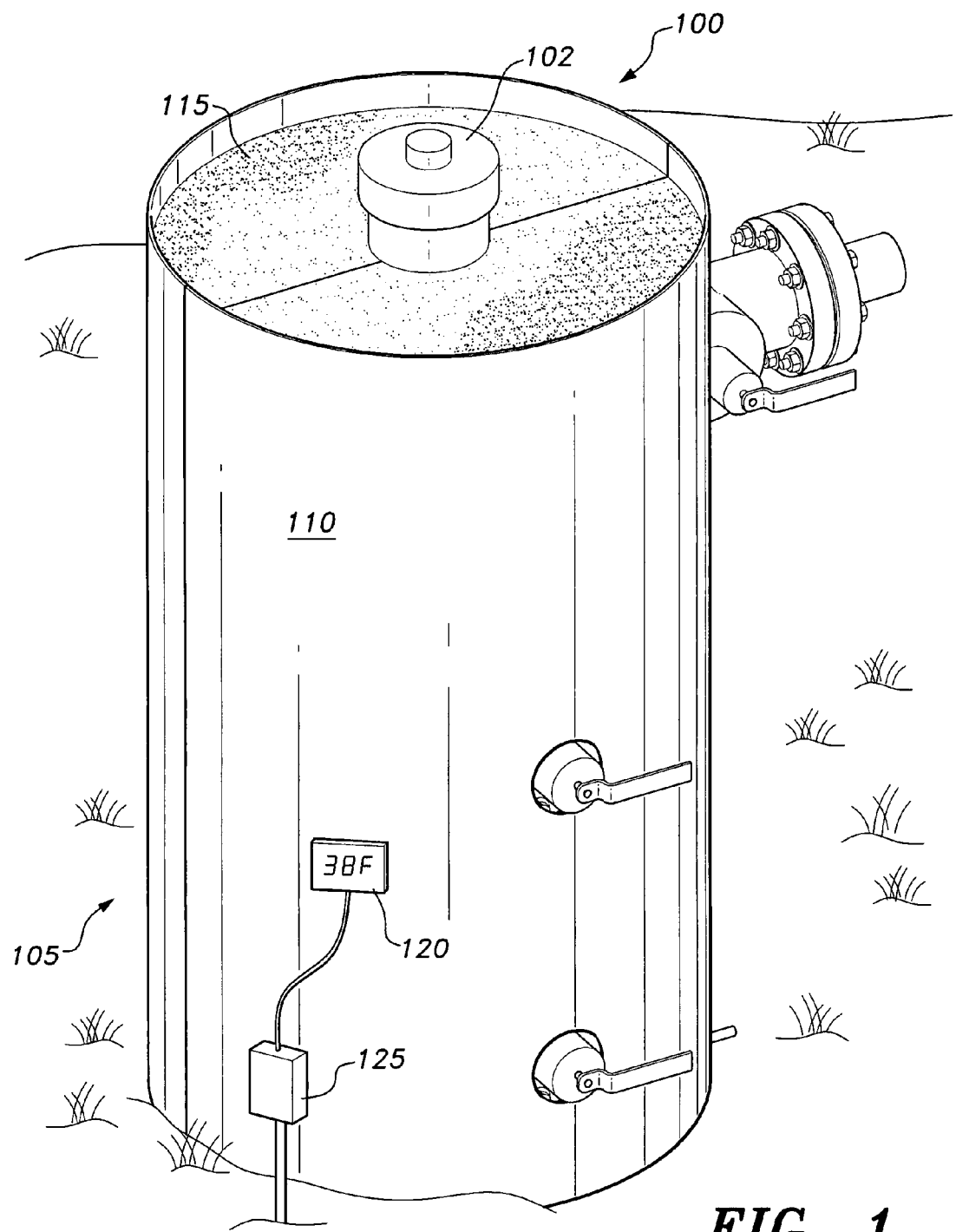
FIG. 1 is an environmental, perspective view of a well head valve insulator according to the present invention.
Figure 2:
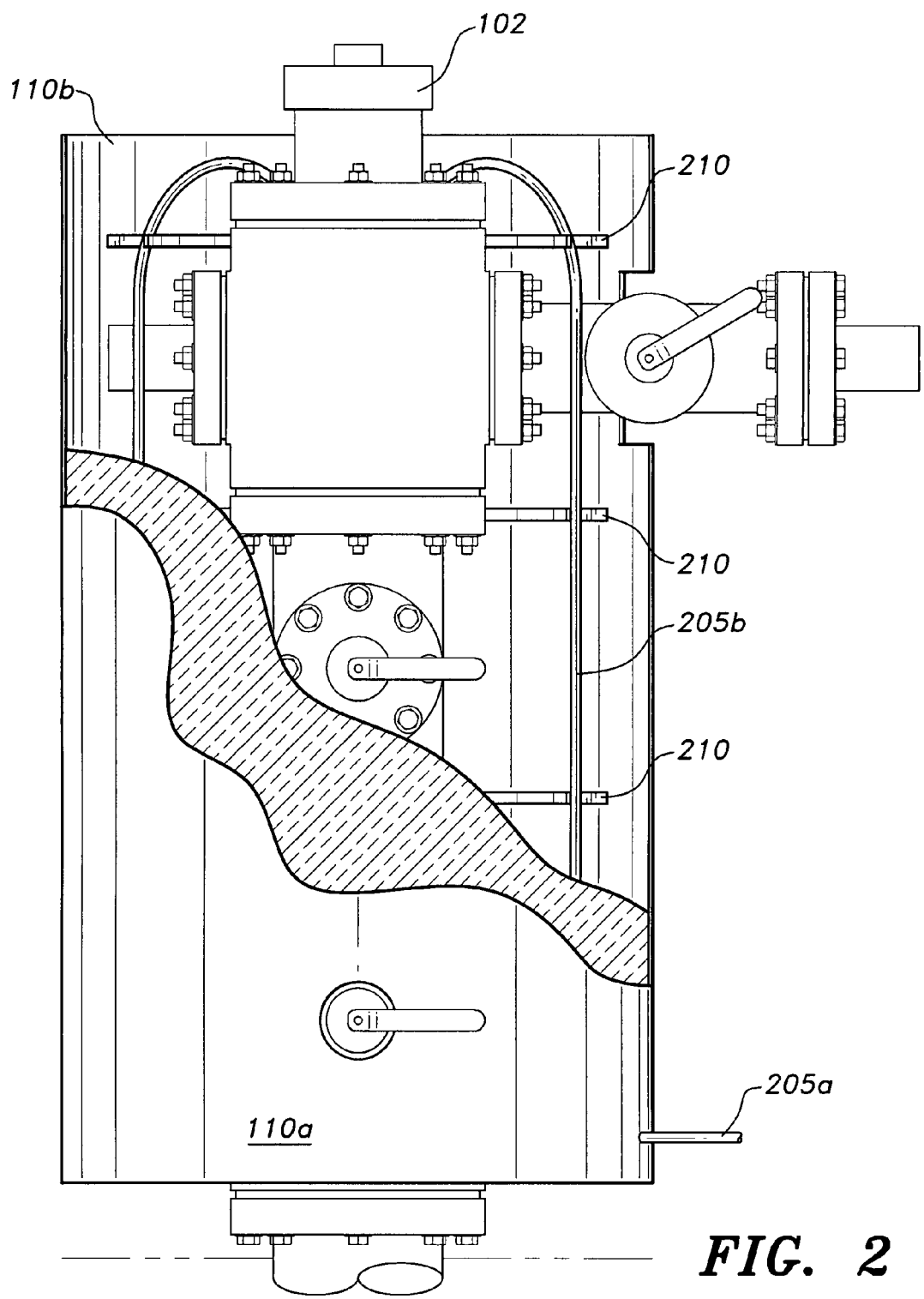
FIG. 2 is a side view of the well head valve insulator according to the present invention, broken away and partially in section to show details of the insulator.
Figure 4:
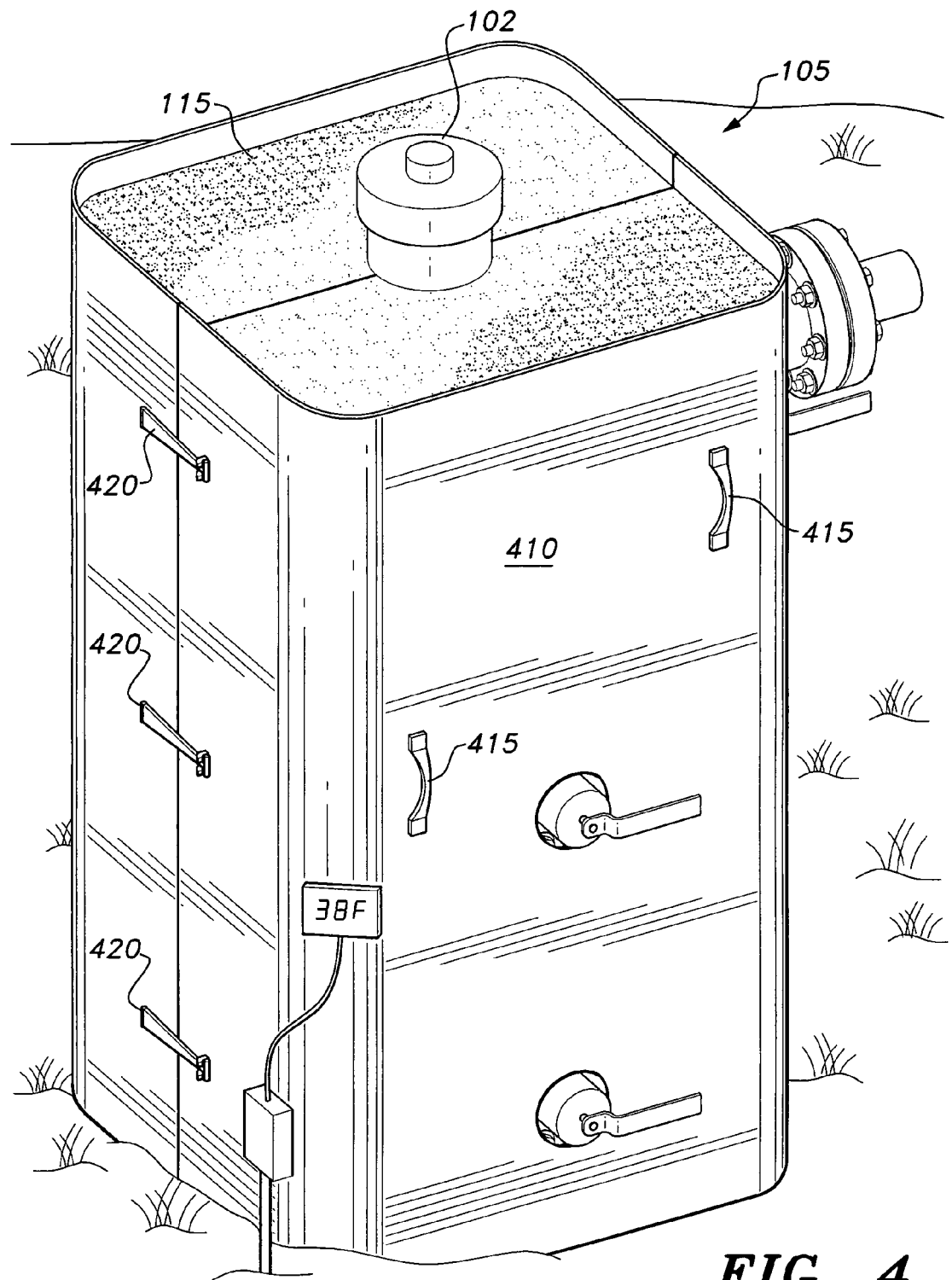
FIG. 4 is an environmental, perspective view of a rectangular well head valve insulator according to the present invention.

The present invention, as shown in FIG. 1, is a well head valve insulator, designated generally as 105 in the drawings, comprising an inner layer of foam insulation 115 surrounded by a rigid outer shell enclosure 110. The rigid outer shell 110 is composed of a plurality of shell sections 110a and 110b shaped to enclose the well head 102 laterally. The shell enclosure 110 may have apertures or cutouts disposed relative to one another so that protruding members of the well head 102 may pass through the cutout apertures when the shell 110 is erected around the well head 102. As shown in FIG. 2, in order to make installation and removal an easy one person job, the shell sections 110a, 110b are preferably formed as two semi cylindrical shells that form a cylindrical tube around the well head, although, as shown in FIG. 4, a rectangular outer shell 410 may also be used. It should be noted that the outer shell may be cylindrical, square, rectangular, or other polygonal configuration.

The rigid outer shell 110 may be made from plastic, fiberglass, or the like, to provide a weather-resistant enclosure around the well head or valve tree 102. Preferably, the outer shell 110 is sufficiently durable so that the outer shell 110, along with other system components, may be reused numerous times. The shell sections 110a and 110b may be made as two discrete components that are held together around the well head 102 with tape or straps, or may be joined together on one side by a living hinge, flexible strap hinge, or the like and releasably joined along the opposite side by tape, clasps, or other releasable fasteners. For example, as shown in FIG. 4, to facilitate easy setup and breakdown of the shell, latch assemblies 420 are disposed across the seam joining halves of rectangular outer shell 410. To keep the shell halves joined, the latches 420 are engaged. To allow separation of the shell halves, the latches 420 are disengaged. Grab handles 415 are disposed on the halves of shell 410 so that the unlatched halves can be easily separated.

Figure 3:
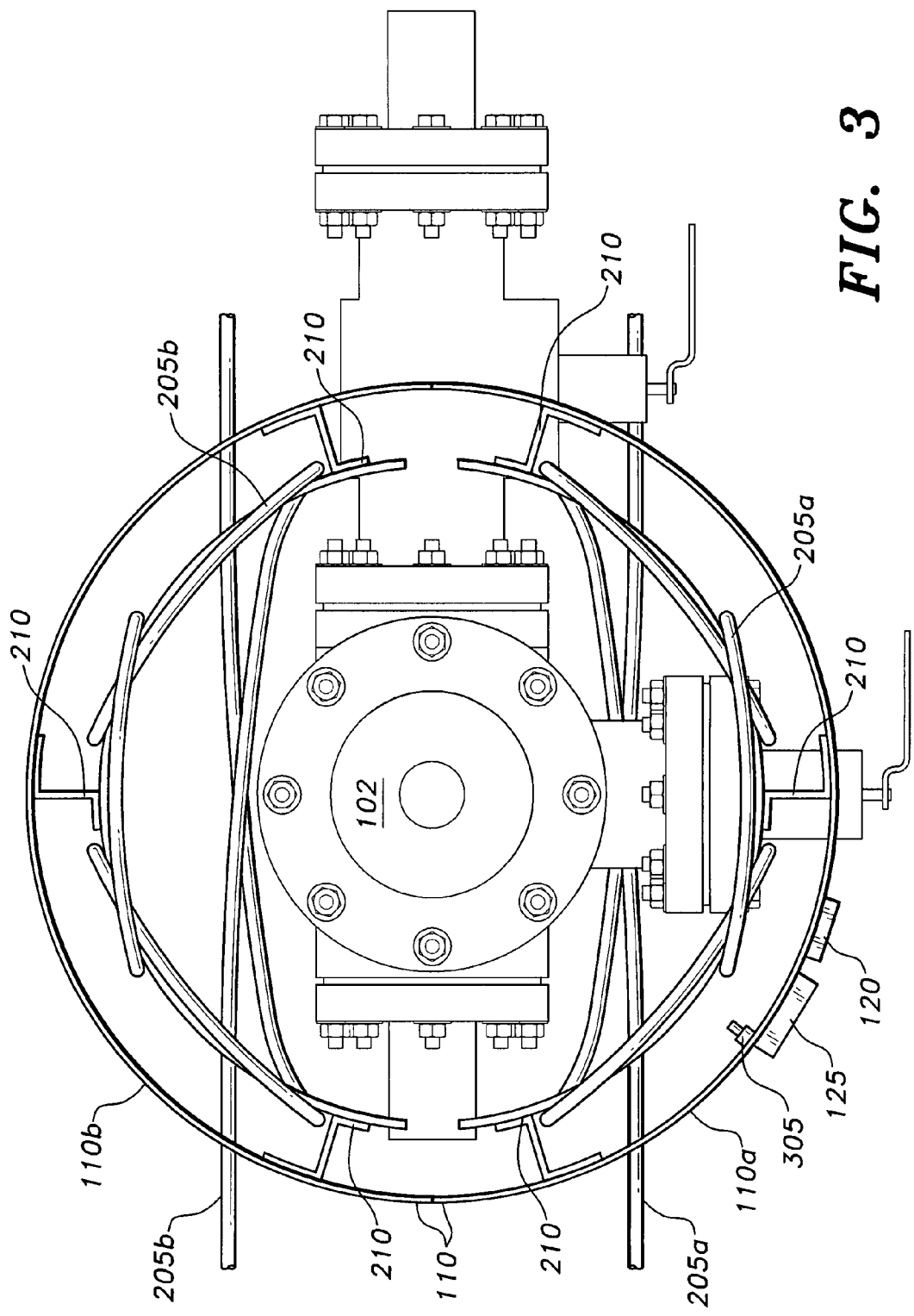
FIG. 3 is a top view of the well head valve insulator according to the present invention without the inner foam insulation.

As shown in FIGS. 2 and 3, heating coils 205a and 205b, which may be flexible hoses or semi-rigid metal, e.g., stainless steel tubing, are disposed within the outer shell 110 and attached to passages or galleries formed within the well head to provide thermal warming of the well head 102 by circulation of a heat exchange medium. The heating coils 205a and 205b may be supported by heating element support members, such as a plurality of arcuate blade members 210. The blade members 210 are flat, planar members that have a Z-shaped attachment boss that provides an attachment surface of the arcuate members 210 so that the arcuate members 210 may be permanently affixed to the interior walls of shell 110. Each blade member 210 has at least gripping element, such as notches defined therein, clips, or jaws that frictionally hold the heating coils 205a, 205b or other heating element.

Injected, poured or sprayed polyurethane foam 115 is disposed to fill the space within the enclosure in order to provide insulation having an R-factor that far exceeds current conventional fiberglass insulation. The polyurethane foam 115 is a material that rodents and insects are not particularly attracted to, which avoids any problem with pests nesting in the insulation. Thus, the foam 115 provides protection from the aforementioned vermin that may carry pathogens, such as the "hanta virus". The foam 115 conforms to the shape of the particular well head 102 during the curing process. When pouring the foam 115, or prior to pouring the foam 115, a user may tape, adhere, or insert wires or other solid, resilient members adjacent to a longitudinal median axis of the well head 115 so that removal of the wire or other resilient members after the foam has cured cuts the foam 115 and permits separation of the foam into neatly removable half sections, requiring no cutting for well head removal, thereby advantageously avoiding the creation of environmental waste during the separation. Preferably the inserted wire can be of a thermoelectric type that generates heat when an electric current is applied. Thus, electrifying the wire facilitates making the required cut for foam separation.

As shown in FIGS. 2 and 3, the heating coils 205a, 205b are incorporated independently into the preferably two half sections of the molded urethane form 115, or the foam 115 is molded around the coils 205a and 205b, which are capable of being connected externally to a heater. The heating coils 205a, 205b have inlet and outlet tubing disposed through holes in the rigid outer shell halves 110a and 110b to provide external connectivity of the independent coils 205a and 205b to each other. The independent heating coil sections may be attached to each other with a preferably removable tube coupling device, while also being removably attached to an external heating circuit, e.g., a glycol circulating pump. Alternatively, or in addition to the heating coils 205a and 205b, heat tape (not shown) may be disposed in the enclosure to provide thermal warming of the well head 102.

The capability to externally interconnect the heating coils 205a and 205b, which are disposed within the urethane foam sections 115, enables the well head valve insulator 105 to function as a unitary device when installed on the valve tree 102.

The well head 102 and heating coils 205a and 205b may be coated with a lubricant to prevent the foam from adhering to the well head 102 and coils 205a and 205b.

An internal temperature sensor or probe 305 may be attached to an interior sidewall of the shell enclosure 110. A thermometer 120, which may be disposed on an exterior sidewall of the shell enclosure 110, is connected to the internal temperature probe 305. An internal temperature data recorder 125 may be provided outside of the enclosure 110. Alternatively, a thermostatic control may be attached to one of the blade members 210 supporting the heating coils 205a, 205b and may be electrically connected to a control mechanism of the external heat pump for automatic temperature regulation of the well head 102.

Additionally, the shell 110 or other exterior element of the insulator 105 may be engraved or stenciled with pertinent information associated with the well bore being protected by the well head valve insulator 105.

The well head valve insulator 105 is particularly adapted for ease of installation and removal around a well head, such as well head 102, in order to make general maintenance of the well head 102, such as greasing valves, and the like, an easy one person task. Additionally, the well head valve insulator 105 may be adapted for pipe fittings in other types of fluid flow systems. Moreover, when the well head valve insulator 105 is employed in fluid flow systems requiring cooling, heating tubes 205a and 205b may be converted into cooling tubes by connecting a pump that circulates a suitable cooling medium through the tubes. It is contemplated by the present invention that the well head valve insulator 105 can provide weatherproofing and resistance to ultraviolet radiation for production equipment, such as well heads, and the like. Moreover, the exterior of shell 410 or shell 110 can be painted to coincide with environmental concerns of the local landscape.

A method for insulating a well head or other pipe fitting may include the steps of: forming a two-piece outer shell of rigid or semi-rigid material around the well head; mounting at least one heating coil support within the outer shell; installing the heater coil; closing the shell around the well head; injecting foam insulation into the outer shell; allowing the foam to cure; and separating the foam.

It is to be understood that the present invention is not limited to the embodiment described above, but encompasses any and all embodiments within the scope of the following claims.

We claim:

1. A well head valve insulator, comprising:
   a rigid outer shell having at least two sections forming an enclosure adapted for surrounding a well head, the shell having cutouts defined therein so that protruding members of the well head extend through the cutouts;
   at least one heating element support member attached to each section of the shell, each heating element support member having at least one gripping element adapted for directly supporting a heating element, wherein the gripping element includes an arcuate blade member and an attachment boss joined to an interior wall of the shell; and
   foam insulation disposed within the outer shell, the foam being split into at least two halves housed within the shell sections so that the shell sections and foam insulation are releasably separable for access to the well head, the foam insulation being molded around the well head in order to closely conform thereto.

2. The well head valve insulator according to claim 1, wherein the rigid outer shell is substantially cylindrical.

3. The well head valve insulator according to claim 1, wherein the rigid outer shell is substantially rectangular.

4. The well head valve insulator according to claim 1, further comprising a plurality of removable straps cinchable around the shell to join the sections forming the enclosure.

5. The well head valve insulator according to claim 1, further comprising a plurality of releasable latches disposed on the shell sections proximate seams defined by junction of the shell sections, the latches releasably joining the sections forming the enclosure.

6. The well head valve insulator according to claim 1, further comprising a plurality of grab handles disposed on sections of the shell enclosure.

7. The well head valve insulator according to claim 1, wherein the shell is made of a durable thermoplastic material.

8. The well head valve insulator according to claim 1, wherein the shell is made of a durable fiberglass material.

9. The well head valve insulator according to claim 1, further comprising a heating wire disposed within the foam, opposing ends of the heating wire being external to the foam so that when electric current is applied to the heating wire the foam can separate proximate the heating wire to facilitate the foam being split into at least two halve sections.

10. The well head valve insulator according to claim 1, further comprising a thermostatic control disposed inside the shell, the thermostatic control being adapted for being electrically connected to a control mechanism of an external heat pump for automatic temperature regulation of the well head.

11. The well head valve insulator according to claim 1, further comprising an internal temperature probe attached to an interior sidewall of the shell enclosure and a thermometer disposed on an exterior wall of the shell enclosure, the thermometer being connected to the internal temperature probe.

12. The well head valve insulator according to claim 11, further comprising an internal temperature data recorder disposed outside of the enclosure.

13. A method for insulating a well head, comprising the steps of:
- forming a two-piece outer shell of substantially rigid material around the well head;
- mounting at least one heating coil support within the outer shell, said at least one heating coil support being attached to each piece of the outer shell, each heating coil support having at least one gripping element adapted for directly supporting a heating coil, wherein the gripping element includes an arcuate blade member and an attachment boss joined to an interior wall of the shell;
- installing the heater coil;
- closing the shell to form an enclosure around the well head;
- injecting foam insulation into the enclosure;
- allowing the foam to cure; and
- separating the foam.

14. The method for insulating a well head according to claim 13, wherein the step of separating the foam further comprises the steps of:
- positioning a heating wire in the foam, opposing ends of the heating wire being external to the foam;
- applying electrical current to the heating wire; and
- moving the heating wire through the foam to separate the foam; wherein heat generated by current passing through heating wire melts the foam to separate the foam in the direction of the cut.

\* \* \* \* \*